United States Patent [19]
Vovan

[11] Patent Number: 6,062,087
[45] Date of Patent: May 16, 2000

[54] HEAT AND PRESSURE SENSOR APPARATUS EMPLOYING A PISTON IN DIRECT CONTACT WITH THE MEASURED FLUID

[75] Inventor: Terry Vovan, Rialto, Calif.

[73] Assignee: ITT Manufacturing Enterprises, Inc., Wilmington, Del.

[21] Appl. No.: 09/159,129

[22] Filed: Sep. 23, 1998

[51] Int. Cl.⁷ .............................. G01L 9/04; G01L 7/16; G01K 1/12; G01K 1/14
[52] U.S. Cl. .................. 73/726; 73/746; 374/143
[58] Field of Search ................ 73/714, 726, 746; 374/143, 144, 100, 101

[56] References Cited

U.S. PATENT DOCUMENTS

| | | | |
|---|---|---|---|
| 3,234,795 | 2/1966 | Li | 73/726 |
| 3,235,826 | 2/1966 | Crites | 338/4 |
| 3,772,628 | 11/1973 | Underwood et al. | 338/4 |
| 4,116,075 | 9/1978 | Ort | 73/708 |
| 4,494,401 | 1/1985 | Dobler et al. | 73/35 |
| 4,500,864 | 2/1985 | Nakane et al. | 338/4 |
| 4,519,254 | 5/1985 | Sonderegger et al. | 73/756 |
| 4,522,067 | 6/1985 | Burger et al. | 73/862.65 |
| 4,625,559 | 12/1986 | Carter et al. | 73/726 X |
| 4,659,235 | 4/1987 | Gilmore, Jr. et al. | 374/143 |
| 4,797,007 | 1/1989 | Elmore, III | 374/143 |
| 4,863,283 | 9/1989 | Falk | 374/181 |
| 4,936,147 | 6/1990 | EerNisse et al. | 73/702 |
| 4,984,905 | 1/1991 | Amano et al. | 374/143 |
| 5,228,333 | 7/1993 | Kleinschmidt et al. | 73/115 |
| 5,323,643 | 6/1994 | Kojima et al. | 73/115 |
| 5,703,282 | 12/1997 | Kuesell et al. | 73/115 |
| 5,712,424 | 1/1998 | Reed | 73/115 |

*Primary Examiner*—Joseph L. Felber
*Attorney, Agent, or Firm*—Thomas L. Peterson

[57] ABSTRACT

Apparatus is provided for sensing the pressure and temperature of fluid within a cavity of a block, such as hot plastic that flows into a mold cavity. The apparatus includes a piston (30) lying closely but slideably within a bore that extends from the cavity in the block. The outer end of the piston is coupled through a beam structure (36), in a shape of a diaphragm, to a rigid support (40). A strain gauge (44) mounted on the diaphragm senses piston deflection which is proportional to the pressure of fluid in the cavity. A highly heat conductive rod (80) extends through a hole in the middle of the piston, the rod having an inner end (84) that is flush with the piston and the rod having an outer end (86) joined at a thermocouple joint (92), so the temperature of the rod is sensed by the thermocouple to thereby sense the temperature of material in the cavity.

13 Claims, 2 Drawing Sheets

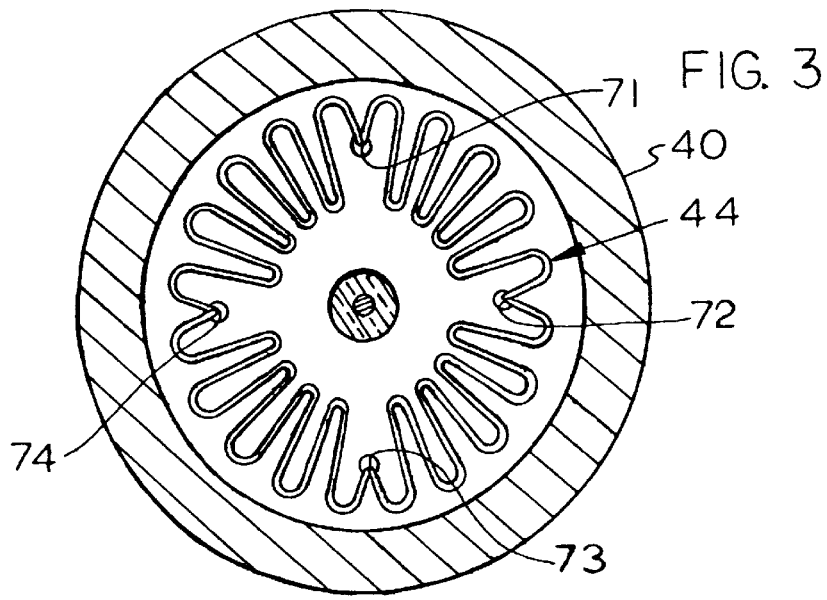
FIG. 3
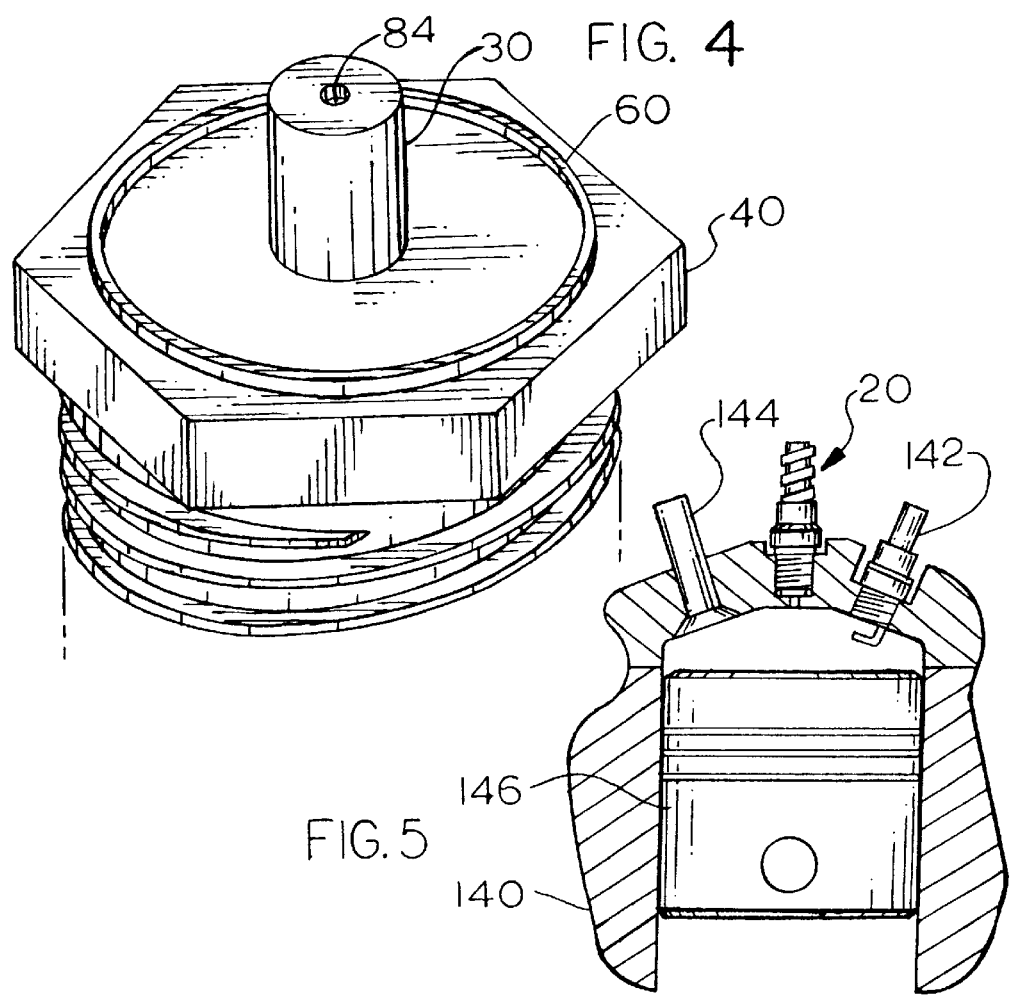
FIG. 4
FIG. 5

HEAT AND PRESSURE SENSOR APPARATUS EMPLOYING A PISTON IN DIRECT CONTACT WITH THE MEASURED FLUID

BACKGROUND OF THE INVENTION

Material is commonly molded by injecting it under a high temperature and pressure into a mold. The temperature and injection pressure is important in obtaining good molded parts, as to assure complete cavity filling, and avoid blockage and excessive shrinkage. Because of high temperatures in the cavity, a pressure sensor usually must be isolated from the high temperatures in the cavity. A temperature sensor should be positioned so it does not leave a highly conspicuous marking on the molded part, and still be accurate. Perhaps most important of all, any pressure and/or temperature sensor must be capable of installation in a mold block with minimal machining of the block and at low cost.

SUMMARY OF THE INVENTION

In accordance with one embodiment of the present invention, a sensor assembly is provided which senses pressure within a cavity, using a strain gauge that is isolated from high temperatures within the cavity, in a simple compact and low cost unit. The sensor assembly includes a piston which lies closely within a bore extending from the cavity, with the inner end of the piston preferably being flush with a cavity wall. The outer end of the piston is attached to one end of a beam structure whose opposite end is held by a support, with a strain gauge mounted on the beam structure to detect deflection of the piston.

To also sense temperature, a thermal rod of high heat-conductive material extends through a hole in the piston, with the inner end of the rod preferably being flush with the inner end of the piston. The outer end of the rod is joined in a thermocouple joint lying in a thermal insulator that lies in the support. The entire sensor assembly can be installed by drilling a small bore so it extends from the cavity, and providing a threaded enlargement at the outer end of the bore where the sensor assembly can be mounted by screwing it into place.

While the sensor assembly was designed for use in molding, it also can be used to detect pressure and temperature in other equipment such as the cylinder of an internal combustion engine.

The novel features of the invention are set forth with particularity in the appended claims. The invention will be best understood from the following description when read in conjunction with the accompanying drawings.

BRIEF DESCRIPTION OF THE DRAWINGS

FIG. 3 is a view taken on line 3—3 of FIG. 2.

FIG. 4 is an isometric view of the inner portion of the sensor assembly of FIG. 2.

FIG. 5 is a sectional view of an internal combustion engine, showing the sensor assembly of FIG. 1 mounted thereat.

DESCRIPTION OF THE PREFERRED EMBODIMENTS

Figure 1:
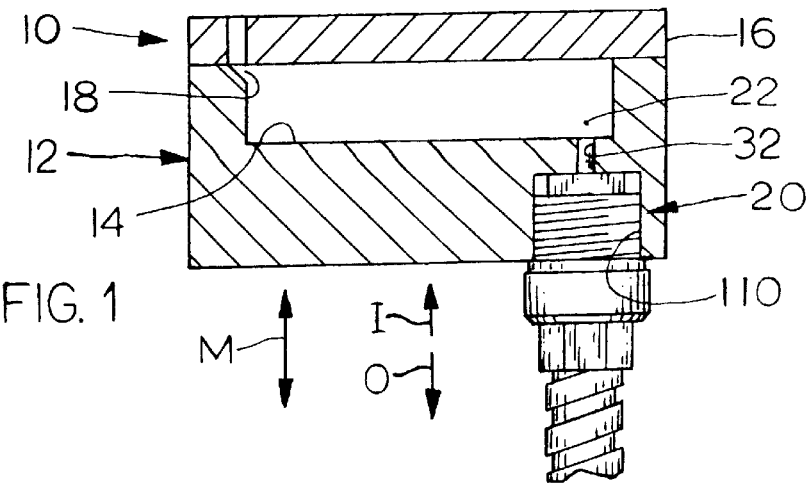
FIG. 1 is a sectional side view of a sensor assembly of the present invention, shown installed in a mold block.

FIG. 1 shows an injection mold 10 that includes a mold block 12 forming a cavity 14, and a mold top 16 that completes the cavity. Material such as an engineering plastic (polymer) in a fluid state, is injected into the cavity through a gate 18, at a pressure such as 20,000 psi and temperature such as 600° F., with some temperatures and pressures being higher. To assure proper molding of the parts, it is desirable to measure the pressure and temperature of material in the mold, such as at a location 22 far from the gate 18. FIG. 1 shows a sensor assembly 20 of the present invention, which is used to measure pressure and temperature at the location 22.

Figure 2:
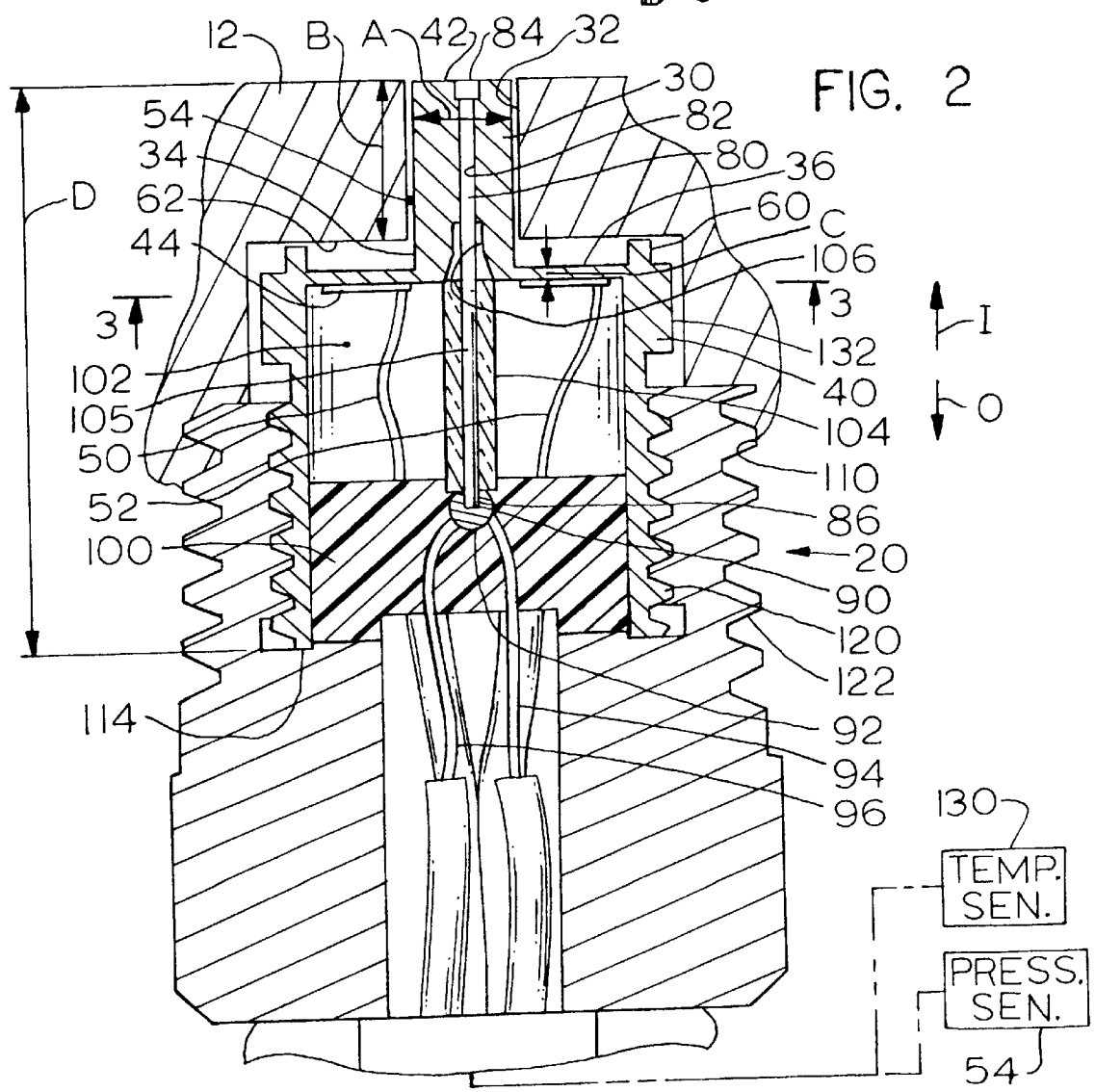
FIG. 2 is an enlarged and more detailed view of the sensor assembly of FIG. 1.

As shown in FIG. 2, the sensor assembly includes a piston 30 which is closely but slidingly received within a bore 32 of the mold block, the bore extending outwardly (arrow O) from the cavity. A longitudinal direction is indicated by arrow M, while particular inner and outer directions are indicated by arrows I and O. The piston has an outer portion 34 that is supported by a bendable beam structure 36. The beam structure is supported by a rigid support 40 that is fixed to the mold block. When a force is applied in an outward direction against the inner tip 42 of the piston, the piston moves outwardly slightly, causing bending of the beam structure 36. A strain gauge or other similar deflection sensor 44 is attached to the beam structure, and generates an output that indicates the amount of beam structure deflection. Beam structure deflection is precisely dependent on (generally proportional to) outward deflection of the piston 30, which is dependent upon (generally proportional to) the pressure of fluid in the cavity. The deflection of the strain gauge 44, which indicates the pressure in the cavity, causes generation of an electrical signal in a pair of pressure sensing conductors 50, 52 which are connected to a pressure sensing circuit 54.

The piston 30 is very closely received within the bore 32 in the mold block, and its tip 42 is preferably flush with the cavity wall. As a result, the piston can slide in response to pressure applied to it, and yet the piston leaves only a very small mark on the finished product. Only a very small mark is produced because the generally high viscosity polymer being molded cannot readily flow through the very thin gap 54 between the piston and the walls of the bore. While the strain gauge 44 is subjected to a temperature higher than that of the surroundings, the temperature is lower than that of the molten material in the cavity. This is because of the path that the high temperature at the piston inner tip 42 must take to reach the strain gauge to heat it, and the path that a colder temperature of the environment takes in passing through the support 40 to reduce the temperature of the strain gauge. Applicant provides a flange 60 to space the beam structure 36 from a largely outwardly-facing wall 62 of the mold block, to reduce heat transfer to the beam structure and the strain gauge thereon. FIG. 3 shows one pattern of a strain gauge 44, which has four terminals 71–74 that can all be used where a balance circuit is used, although only two terminals can be used where desired.

The sensor assembly of FIG. 2 also enables measurement of the temperature of material in the cavity, where the material is pressing against the inner tip 42 of the piston. A thermal rod 80, which is a rod of highly heat conductive material (thermal conductivity of at least 10 BTU/hr-ft° F.) which can withstand high temperatures, has a rod inner portion that lies in a hole 82 of the piston, with a rod inner end 84 preferably being flush with the inner tip 42 of the piston. A rod of a copper alloy or tungsten can be used. The rod has an outer end 86 that lies outward of the piston and the beam structure 36. The rod outer end 86 is connected at a thermocouple 90 in a joint 92 between conductors such as 94, 96 of dissimilar materials such as iron and constantine or chromel and allumel. In actuality, the thermal rod 80 can be said to form a part of the thermocouple. The joint at 92 lies in a thermal insulator 100 (thermal conductivity less than 1 BTU/hr-ft° F.) such as mullite, so the temperature of the joint at 92 is close to the temperature of the rod 80. The space 102 between the beam structure 36 and thermal insulator 100, is preferably formed of air, which is a poor heat conductor. A tube 104 of heat insulating material such as mullite lies around a bridging part 105 of the rod that connects the rod inner and outer ends. It is found that the temperature at the outer end 86 of the rod is very close to the temperature of material in the cavity that lies against the rod inner end 84. Where the environmental temperature was about 75° F. and the temperature of material in the mold was about 500° F., the temperature at the joint 92 was about 498° F., with the difference (2° F.) between the inner and outer ends of the rod being fairly constant for a given temperature of the molding material above the environmental temperature. It is noted that the piston has a cut-a-way outer portion at 106, to minimize heat transfer between the outer end of the piston and the thermal rod portion lying thereat. Although the thermal rod 80 moves slightly as pressure is applied to the piston, the movement is very small, typically being no more than about one-thousanth inch, which can be readily withstood by the thermal insulator material 100 (mullite is similar to a ceramic, but is able to take slight deflection without shattering).

The sensor assembly 20 can be installed with a minimum modification to the mold block 12. As shown in FIG. 1, a large diameter outer bore portion 110 can be formed in the block, and pipe threads formed within the outer bore portion. Also, a precision inner bore at 32 is formed which connects the outer bore portion 110 to the cavity. The sensor assembly 20 is then installed by turning it to thread it into place until the flange 60 (FIG. 2) engages the wall 62. The distance between the flange 60 and the piston inner tip 42 is closely controlled, so if the length of the bore 32 is also precisely controlled, the piston tip 42 will lie flush with the walls of the cavity.

In a sensor assembly of the construction illustrated, that applicant has constructed and successfully tested, the piston had a diameter A of 0.0935 inch, with a clearance at gap 54 being no more than about 0.001 inch. The bore length B was 0.188 inch. The beam structure 36 is in the form of a diaphragm, in that it is a simple plate, with the plate having a thickness C of 0.020 inch. The length D of the sensor assembly between the piston inner tip 42 and the location 114 was 0.583 inch. Applicant formed a support 40 with two parts 120,122 that threaded together, to facilitate manufacture with the outer part 122 being screwed into the threaded outbore portion 110 formed in the mold block. The conductors 94, 96 of the thermocouple are connected to a temperature sensor 130. A sensor assembly frame 132, which includes the piston 30, beam structure 36 and support part 120 was formed of a machined single block of stainless steel.

FIG. 5 shows the sensor assembly 20 installed at the head of an internal combustion cylinder block 140. The sensor assembly is shown lying between a spark plug 142 and valves 144. The sensor assembly can be useful to sense the almost instantaneous pressure and the temperature of gases in the cylinder above the piston part 146. Use of the sensor assembly is enhanced by the fact that little machining of the cylinder head is required to install the sensor, and because it is compact and provides an accurate indication of instant pressure and average temperature, without the strain gauge used for pressure being subject to the very high temperatures within the cylinder.

Where only the temperature of fluid in the cavity of a block is required, the piston does not have to move, and therefore can be referred to as a piston member. However, an inner part of the frame in the form of a usual piston (a largely solid cylinder) is preferred.

Thus, the invention provides a sensor assembly for sensing pressure and/or temperature within a cavity of a block, which can be mounted in a simple manner in a block and which provides accurate measurements. The sensor assembly includes a piston that lies in a bore of the block that opens to the cavity, with the inner end of the piston mounted on a beam structure to which a strain gauge is attached, and with the opposite end of the beam structure mounted on a support that is fixed to the block. The temperature drop along the piston results in the strain gauge being subjected to a lower temperature than that in the cavity, in an apparatus that is easily installed in the block. A rod of high heat-conducting material extends through the piston and outwardly therefrom, with the outer end of the rod connected in a thermocouple joint. The outer end of the rod has a temperature close to that of the inner end of the rod which is exposed to fluid in the cavity, with the difference being predictable. A thermal insulator lies within the support, with the thermocouple junction lying on or in the thermal insulator, to thermally isolate the outer end of the rod from the support. While the sensor assembly is especially useful for sensing the temperature of material being molded or cast in a mold cavity, the sensor assembly is useful in other applications such as to measure the temperature and pressure of gas in a cylinder as of an internal combustion engine. The sensor assembly can be made so it has a small size, for faster response and so it has minimal effect on the apparatus in which is it mounted.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Sensing apparatus comprising:
    a sensor assembly which includes a piston with longitudinally-spaced inner and outer ends;
    a support, a beam structure which connects said piston outer end to said support, and a strain gauge means coupled to said beam structure for detecting beam structure deflection;
    said piston having a longitudinally extending through hole, and said sensor assembly including a thermal rod of highly heat conductive material extending through said hole in said piston and having a rod outer end, and said sensor assembly also including a thermocouple joint lying against said rod outer end.
2. The apparatus described in claim 1 including:
    a thermal insulator lying in and mounted on said support with said thermal insulator having an inner support end spaced from said beam structure and with said thermocouple joint mounted in said thermal insulator.
3. The apparatus described in claim 2 wherein:
    said thermal rod has an outer bridging portion extending from said outer end of said piston to said inner support end of said thermal insulator; and including
    a tube of heat insulating material lying around said bridging portion of said thermal rod.
4. The apparatus described in claim 1 including:
    a block that forms a cavity inner surface, with said support mounted in said block, and wherein:

said block has an outer surface and has a mounting hole extending into said block outer surface, said block also having a precision cylindrical bore extending from said mounting hole to said cavity inner surface, with said piston lying closely within said precision cylinder hole in a sliding fit therein.

5. The apparatus described in claim 1 including:

a mold block that forms a mold cavity and that forms a gate through which molten polymer material passes into said cavity, said block forms a flat cavity wall, said rod has an inner end, and said piston inner end and said rod inner end are flush with said flat cavity wall.

6. Apparatus for sensing characteristics of a fluid in a cavity, comprising:

a block having cavity walls forming a cavity;

a sensor assembly comprising a piston with longitudinally-spaced inner and outer portions, a support, and a bendable beam structure extending largely perpendicular to said longitudinal direction and connecting said piston outer portion to said support;

said block having a bore extending outwardly from said cavity, said support mounted on said block with said piston lying slideably in said bore, with said piston lying closely within said bore to form a thin gap between them that minimizes the passage of fluid from said cavity into said gap, and with said piston inner portion having an inner tip lying at said cavity to receive the force of pressured fluid material lying in said cavity;

a strain gauge device coupled to said beam structure, to generate an electrical signal indicating the magnitude of deflection of said beam structure.

7. The apparatus described in claim 6 wherein:

said gap has a thickness of no more than about 0.001 inch.

8. Apparatus for sensing characteristics of fluid in a cavity of a block, comprising:

a sensor assembly frame which includes a member having an inner end for exposure to said fluid and having an outer end, and a support for mounting on said block, with said support supporting said outer end of said member;

a thermal insulator mounted in said support and spaced outwardly from said member;

said member having a through bore extending in inner and outer directions, therethrough;

a thermal rod of highly heat conductive material projecting through said bore, said rod having a rod inner end lying at said member inner end and said rod having a rod outer end lying at said thermal insulator;

a thermocouple joint lying at and coupled to said rod outer end.

9. The apparatus described in claim 8 wherein:

said sensor assembly frame includes a beam structure extending primarily perpendicular to said inner and outer directions and joining said member to said support;

gauge means for sensing deflection of said member.

10. The apparatus described in claim 9 including said block and wherein:

said block has a bore extending outwardly from said cavity, and said member lies closely within said bore in a sliding fit therein, with said block having a threaded outer bore portion and said support being threadably mounted in said threaded outer bore portion.

11. Apparatus for sensing characteristics of a fluid in a cavity, comprising:

a block having cavity walls forming a cavity;

a sensor assembly comprising a piston with longitudinally-spaced inner and outer portions, a support, and a bendable beam structure extending largely perpendicular to said longitudinal direction and connecting said piston outer portion to said support;

said block having a bore extending outwardly from said cavity, said support mounted on said block with said piston lying slideably in said bore and with said piston inner portion having an inner tip lying at said cavity to receive the force of pressured fluid material lying in said cavity;

a strain gauge device coupled to said beam structure, to generate an electrical signal indicating the magnitude of deflection of said beam structure;

said piston having a longitudinally-extending hole, and including a rod of highly heat conductive material having an inner end lying substantially at said cavity to be substantially the same temperature as that of fluid material lying in said cavity, and said rod having an outer end lying at least as far outward as said beam structure;

a thermocouple having a joint connected to said rod outer end.

12. Apparatus for sensing characteristics of a fluid in a cavity, comprising:

a block having cavity walls forming a cavity;

a sensor assembly comprising a piston with longitudinally-spaced inner and outer portions, a support, and a bendable beam structure extending largely perpendicular to said longitudinal direction and connecting said piston outer portion to said support;

said block having a bore extending outwardly from said cavity, said support mounted on said block with said piston lying slideably in said bore and with said piston inner portion having an inner tip lying at said cavity to receive the force of pressured fluid material lying in said cavity;

a strain gauge device coupled to said beam structure, to generate an electrical signal indicating the magnitude of deflection of said beam structure;

said block has a largely outwardly-facing wall at the outer portion of said piston, and said support has a supporting inner surface and has a flange projecting inwardly from said support inner surface for spacing the rest of said inner surface and said beam structure from said largely outwardly-facing wall, to minimize heat transfer to said support.

13. The molding apparatus described in claim 12 wherein:

said beam structure is in the form of a diaphragm, with said piston, diaphragm, and at least part of said support being machined from a single piece of metal.

* * * * *